(12) United States Patent
Forsberg et al.

(10) Patent No.: US 10,760,504 B2
(45) Date of Patent: Sep. 1, 2020

(54) METHOD FOR CONTROLLING AN INTERNAL COMBUSTION ENGINE

(71) Applicant: VOLVO TRUCK CORPORATION, Gothenburg (SE)

(72) Inventors: Mikael Forsberg, Göteborg (SE); Sören Andermård, Kareby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/461,810

(22) PCT Filed: Dec. 20, 2016

(86) PCT No.: PCT/EP2016/081981
§ 371 (c)(1),
(2) Date: May 17, 2019

(87) PCT Pub. No.: WO2018/113930
PCT Pub. Date: Jun. 28, 2018

(65) Prior Publication Data
US 2019/0309693 A1    Oct. 10, 2019

(51) Int. Cl.
*F02D 17/02*        (2006.01)
*F02M 26/01*        (2016.01)
(Continued)

(52) U.S. Cl.
CPC ............. *F02D 17/026* (2013.01); *F02D 9/02* (2013.01); *F02D 9/04* (2013.01); *F02D 17/023* (2013.01);
(Continued)

(58) Field of Classification Search
CPC ................. F02D 17/023; F02D 17/026; F02D 2009/022; F02D 2009/0222;
(Continued)

(56) References Cited

U.S. PATENT DOCUMENTS 4,131,095 A * 12/1978 Ouchi ....................... F02B 1/06
                                                              123/3
4,159,700 A *  7/1979 McCrum ................. F02B 41/06
                                                              123/1 R
(Continued)

FOREIGN PATENT DOCUMENTS

DE        4421258 A1    12/1995
DE      19500761 A1     7/1996
(Continued)

OTHER PUBLICATIONS

International Search Report (dated Sep. 1, 2017) for corresponding International App. PCT/EP2016/081981.

*Primary Examiner* — Kevin R Steckbauer
(74) *Attorney, Agent, or Firm* — Venable LLP; Jeffri A. Kaminski

(57) ABSTRACT

A method is provided for controlling an internal combustion engine including at least one first cylinder and at least one second cylinder with respective reciprocating pistons, each of the first and second cylinders being arranged to receive air from a fresh air intake arrangement, to receive fuel, and to provide repetitive combustions by means of the received air and fuel, the method including receiving in the first cylinder air from the fresh air intake arrangement, expelling from the first cylinder gases in the form of the air received in the first cylinder or gases including at least a portion of the air received in the first cylinder, guiding to the second cylinder gases expelled from the first cylinder, injecting fuel into the second cylinder so as to provide repetitive combustions with air in the gases guided from the first cylinder to the second cylinder, and, while guiding to the second cylinder gases expelled from the first cylinder, throttling or inhibiting the supply to the second cylinder of air from the fresh air intake arrangement, wherein guiding to the second cylinder gases
(Continued)

expelled from the first cylinder includes guiding to the second cylinder all gases expelled from the first cylinder.

14 Claims, 4 Drawing Sheets

(51) Int. Cl.
*F02M 26/43* (2016.01)
*F02D 9/02* (2006.01)
*F02D 9/04* (2006.01)
*F02D 41/00* (2006.01)
*F02M 26/22* (2016.01)

(52) U.S. Cl.
CPC ......... *F02D 41/006* (2013.01); *F02D 41/008* (2013.01); *F02D 41/0082* (2013.01); *F02D 41/0087* (2013.01); *F02M 26/01* (2016.02); *F02M 26/43* (2016.02); *F02D 2009/0222* (2013.01); *F02D 2041/0022* (2013.01); *F02D 2200/023* (2013.01); *F02M 26/22* (2016.02); *Y02T 10/47* (2013.01)

(58) Field of Classification Search
CPC ..... F02D 2009/0235; F02D 2009/0237; F02D 41/0082; F02D 2041/0022
See application file for complete search history.

(56) References Cited

U.S. PATENT DOCUMENTS

| | | | | |
|---|---|---|---|---|
| 4,303,053 A * | 12/1981 | Etoh | ................ | F02D 17/02 123/198 F |
| 4,365,597 A | 12/1982 | Iizuka et al. | | |
| 6,178,933 B1 * | 1/2001 | Lavy | ................ | F02B 47/08 123/568.11 |
| 6,427,644 B1 * | 8/2002 | Dabadie | ................ | F02B 47/08 123/58.8 |
| 6,431,128 B1 * | 8/2002 | Dabadie | ................ | F02B 1/12 123/58.8 |
| 6,877,464 B2 * | 4/2005 | Hitomi | ................ | F01L 1/267 123/295 |
| 6,923,149 B2 * | 8/2005 | Nishimoto | ................ | F01L 1/143 123/58.8 |
| 6,925,979 B1 * | 8/2005 | Seitz | ................ | F02B 29/0406 123/179.18 |
| 6,971,343 B2 * | 12/2005 | Hitomi | ................ | F01L 1/267 123/27 R |
| 7,096,833 B2 * | 8/2006 | Hitomi | ................ | F02B 75/20 123/305 |
| 7,182,050 B2 * | 2/2007 | Hitomi | ................ | F01L 1/185 123/58.8 |
| 7,219,634 B2 * | 5/2007 | Hitomi | ................ | F01L 1/185 123/295 |
| 7,621,240 B2 * | 11/2009 | Almkvist | ................ | F02D 13/0215 123/58.8 |
| 7,765,994 B2 * | 8/2010 | Winstead | ................ | F02M 26/43 123/305 |
| 7,779,823 B2 * | 8/2010 | Winstead | ................ | F02M 26/43 123/316 |
| 7,801,664 B2 * | 9/2010 | Winstead | ................ | F02M 26/01 123/198 F |
| 7,963,273 B2 * | 6/2011 | Winstead | ................ | F02M 26/43 123/295 |
| 8,020,525 B2 * | 9/2011 | Winstead | ................ | F02M 26/43 123/568.11 |
| 8,074,629 B2 * | 12/2011 | Winstead | ................ | F02M 26/01 123/198 F |
| 8,205,583 B2 * | 6/2012 | Winstead | ................ | F02M 26/43 123/568.11 |
| 9,835,065 B2 * | 12/2017 | Jozsa | ................ | F02D 13/0273 |
| 9,856,806 B2 * | 1/2018 | Bjurman | ................ | F02D 17/02 |
| 10,513,992 B1 * | 12/2019 | Gukelberger | ....... | F02D 41/0055 |
| 2004/0065278 A1 * | 4/2004 | Nishimoto | ................ | F01L 13/0005 123/58.8 |
| 2004/0065279 A1 * | 4/2004 | Hitomi | ................ | F02M 26/42 123/58.8 |
| 2004/0168655 A1 * | 9/2004 | Hitomi | ................ | F02D 41/1475 123/58.8 |
| 2004/0168656 A1 | 9/2004 | Hitomi et al. | | |
| 2005/0022755 A1 * | 2/2005 | Hitomi | ................ | F02M 26/01 123/58.8 |
| 2005/0172923 A1 * | 8/2005 | Seitz | ................ | F02B 29/0406 123/179.18 |
| 2008/0134999 A1 * | 6/2008 | Almkvist | ................ | F02M 26/42 123/58.8 |
| 2009/0013667 A1 * | 1/2009 | Winstead | ................ | F02D 41/008 60/278 |
| 2009/0013668 A1 * | 1/2009 | Winstead | ................ | F02D 41/006 60/278 |
| 2009/0013669 A1 * | 1/2009 | Winstead | ................ | F02D 41/008 60/278 |
| 2009/0013969 A1 * | 1/2009 | Winstead | ................ | F02D 41/0087 123/481 |
| 2010/0180859 A1 * | 7/2010 | Hatamura | ................ | F02D 13/0273 123/295 |
| 2010/0307435 A1 * | 12/2010 | Winstead | ................ | F02D 13/0219 123/90.15 |
| 2011/0107986 A1 * | 5/2011 | Winstead | ................ | F02D 13/0219 123/90.15 |
| 2012/0006288 A1 * | 1/2012 | Winstead | ................ | F02D 41/008 123/58.8 |
| 2015/0040560 A1 * | 2/2015 | Jozsa | ................ | F01N 3/035 60/602 |
| 2016/0298557 A1 * | 10/2016 | Bjurman | ................ | F02D 17/02 |
| 2020/0080469 A1 * | 3/2020 | Janhunen | ................ | F02D 41/0007 |

FOREIGN PATENT DOCUMENTS

| | | |
|---|---|---|
| DE | 102009004418 A1 | 7/2010 |
| EP | 1403490 A1 | 3/2004 |
| JP | 2006009656 A | 1/2006 |
| JP | 2007231791 A | 9/2007 |
| WO | 03046354 A1 | 6/2003 |
| WO | 03067066 A1 | 8/2003 |
| WO | 2006111280 A1 | 10/2006 |
| WO | 2009037120 A1 | 3/2009 |
| WO | 2012150879 A1 | 11/2012 |

* cited by examiner

METHOD FOR CONTROLLING AN INTERNAL COMBUSTION ENGINE

BACKGROUND AND SUMMARY

The invention relates to a method for controlling an internal combustion engine. The invention also relates to a computer program, a computer readable medium, a control unit, an internal combustion engine, and a vehicle.

The invention can be applied in heavy-duty vehicles, such as trucks, buses and construction equipment, such as wheel loaders, haulers and excavators. Although the invention will be described with respect to a truck, the invention is not restricted to this particular vehicle, but may also be used in other vehicles such as buses, construction equipment and passenger cars. The invention may also be used on other transportation means such as ships and boats.

For a vehicle internal combustion engine, such as a diesel type engine for a heavy-duty vehicle, an exhaust after treatment system (EATS) is usually provided to reduce emissions, e.g. of nitrogen oxides (NOx). Such a system, which may include units such as a selective catalytic reduction (SCR) converter, requires exhaust gas temperatures that are relatively high in order to provide an efficient emission reduction.

However, measures to reduce fuel consumption may reduce the heat loss from the engine to the EATS. Therefore, particularly at low load operation, cold ambient temperatures, and/or cold start events, the EATS might not get enough heat to operate efficiently.

US2015040560A1 discloses, for increasing the temperature in an EATS when cold starting an engine, an exhaust gas recirculation (EGR) pipe which is branched off at an exhaust gas manifold part assigned to an inactive cylinder group. The EGR pipe forces air to an intake manifold part assigned to an active cylinder group. Each cylinder group comprises an intake throttle, which is adapted to be separably operable. The air intake upstream of the active intake manifold is throttled to increase the forced air flow. Although this may provide some improvement in cold start situations, there is still a need to further increase EATS temperatures at low load operations.

It is desirable to reduce emissions from internal combustion engines. It is also desirable to improve the after treatment of exhaust gases from internal combustion engines at low load operations.

According to an aspect of the invention, a method is provided for controlling an internal combustion engine comprising at least one first cylinder and at least one second cylinder with respective reciprocating pistons, each of the first and second cylinders being arranged to receive air from a fresh air intake arrangement, to receive fuel, and to provide repetitive combustions by means of the received air and fuel, the method comprising receiving in the first cylinder air from the fresh air intake arrangement, expelling from the first cylinder gases in the form of the air received in the first cylinder or gases including at least a portion of the air received in the first cylinder, guiding to the second cylinder gases expelled from the first cylinder, injecting fuel into the second cylinder so as to provide repetitive combustions with air in the gases guided from the first cylinder to the second cylinder, and, while guiding to the second cylinder gases expelled from the first cylinder, throttling or inhibiting the supply to the second cylinder of air from the fresh air intake arrangement, wherein guiding to the second cylinder gases expelled from the first cylinder comprises guiding to the second cylinder all gases expelled from the first cylinder.

Receiving in the first cylinder air from the fresh air intake arrangement and guiding to the second cylinder gases expelled from the first cylinder provides for heating by pre-conditioning of the air. Throttling or inhibiting the supply to the second cylinder of air from the fresh air intake arrangement limits temperature reductions caused by introduction of fresh air.

In addition, guiding to the second cylinder all gases expelled from the first cylinder means that no gases introduced to the first cylinder will reach an exhaust after treatment system (EATS) arranged to receive exhaust gases from the engine, without passing the second cylinder. Thereby the mass flow through the engine may be substantially decreased, and a further significant increase of the temperature of gases reaching the EATS at low load operations, cold start events or low ambient temperatures may be provided. This will improve the after treatment of exhaust gases from the engine, e.g. at low load, and thereby engine emissions will be reduced.

Also, the second cylinder combustions per se may be controlled without consideration for keeping exhaust gas temperatures high. Therefore the emission reduction may be provided without having to compromise running the engine for an optimal fuel efficiency.

The invention may significantly improve exhaust after treatment processes of diesel engines at extended low load or idling operations, such as operations of asphalt laying vehicles, in queues or in city driving.

Preferably, expelling gases from the first cylinder comprises expelling from the first cylinder the same amount of air as received in the first cylinder. Thereby, fuel injection into the first cylinder may be terminated so as to avoid combustions therein. Nevertheless, the air may be heated by compression in the first cylinder. The method may comprise injecting fuel into the first cylinder so as to provide repetitive combustions with the air received in the first cylinder. Thereby, heating of the gases reaching the second cylinder may be increased by the combustion in the first cylinder, whereby the overall heating capacity of the process is increased.

The method may advantageously comprise switching between a first mode with no injection of fuel into the first cylinder, and a second mode with injection of fuel into the first cylinder so as to provide repetitive combustions with the air received in the first cylinder. It should be noted that preferably the amount of fuel injected into the first cylinder is smaller, preferably considerably smaller, than the amount of fuel injected into the second cylinder.

According to another aspect of the invention, a method is provided for controlling an internal combustion engine comprising at least one first cylinder and at least one second cylinder with respective reciprocating pistons, each of the first and second cylinders being arranged to receive air from a fresh air intake arrangement, to receive fuel, and to provide repetitive combustions by means of the received air and fuel, the method comprising receiving in the first cylinder air from the fresh air intake arrangement, expelling from the first cylinder gases in the form of the air received in the first cylinder or gases including at least a portion of the air received in the first cylinder, guiding to the second cylinder gases expelled from the first cylinder, injecting fuel into the second cylinder so as to provide repetitive combustions with air in the gases guided from the first cylinder to the second cylinder, and, while guiding to the second cylinder gases expelled from the first cylinder, throttling or inhibiting the supply to the second cylinder of air from the fresh air intake arrangement, the method further comprising injecting fuel into the first cylinder so as to provide repetitive combustions with the air received in the first cylinder.

As also suggested above, injecting fuel into the first cylinder so as to provide repetitive combustions with the air received in the first cylinder may advantageously increase heating of the gases reaching the second cylinder, whereby the overall heating capacity of the process is increased.

Preferably, where each of the first and second cylinders is arranged to receive air from the fresh air intake arrangement via first and second intake guides, respectively, expelling gases from the first cylinder is done by means of an exhaust guide extending from the first cylinder, e.g. to the atmosphere via an EATS, and guiding to the second cylinder gases expelled from the first cylinder comprises at least partly closing an exhaust valve in the exhaust guide. For example, guiding to the second cylinder gases expelled from the first cylinder may be done by means of a recirculation guide extending from the exhaust guide and to the second intake guide, and the exhaust valve may be provided downstream of the recirculation guide. The exhaust valve may effectively provide for selectively guiding a portion or all of the gases from the first cylinder into the recirculation guide.

Said exhaust guide may be referred to as a first exhaust guide. The expelling gases from the second cylinder may be done by means of a second exhaust guide extending from the second cylinder. Preferably, the first and second exhaust guides merge downstream of the exhaust valve.

Preferably a turbine of a turbo charger is located downstream of the exhaust valve. Thereby, such a location of the exhaust valve may secure that heat is not lost by expansion in the turbine before the gases reach the second cylinder. The exhaust valve may prevent a partial flow to the turbine, and secure that all gases expelled from the first cylinder are guiding to the second cylinder.

Preferably, where each of the first and second cylinders is arranged to receive air from the fresh air intake arrangement via first and second intake guides, respectively, at least one compressor is provided upstream of the first and second intake guides and downstream of the fresh air intake arrangement. Thereby, an advantageous arranged of a single compressor service the two intake guide may be provided.

Preferably, where each of the first and second cylinders is arranged to receive air from the fresh air intake arrangement via first and second intake guides, respectively, the expelling of gases from the first cylinder is done by means of a first exhaust guide extending from the first cylinder, and guiding to the second cylinder gases expelled from the first cylinder is done by means of a recirculation guide extending from the first exhaust guide and to the second intake guide, the method further comprises expelling from the second cylinder gases by means of a second exhaust guide extending from the second cylinder, e.g. to the atmosphere via an EATS, and recirculating gases from the first and second exhaust guides to the first and second cylinder by means of an exhaust gas recirculating (EGR) passage provided in addition to the recirculation guide.

Thus the recirculation guide may be provided in addition to the EGR passage. The recirculation guide may bypass the EGR passage. Thereby, the EGR passage may be used in a traditional manner, at most operational situations, and include an EGR cooler for reducing the temperature of recirculated exhaust gases. By the recirculation guide, the heating process described above, e.g. for low load operation, may be provided without interference or adverse effect of the EGR cooler. A valve may be provided to control and selectively inhibit gas flow through the EGR passage. It should be noted however, that the method may involve guiding gases through the EGR passage as well as through the recirculation guide.

The method may comprise compressing in the second cylinder the gases guided to the second cylinder, and injecting the fuel into the compressed gases. Thereby the method may be advantageously provided in an engine adapted for a diesel cycle.

According to another aspect of the invention, a method is provided for controlling an internal combustion engine comprising at least one first cylinder and at least one second cylinder with respective reciprocating pistons, first and second intake guides arranged to guide air from a fresh air intake arrangement to the first and second cylinders, respectively, an intake valve arrangement being arranged to control the provision of air to the second cylinder via the second intake guide, a fuel system arranged to inject fuel into the first and second cylinders, a first exhaust guide and a second exhaust guide arranged to guide gases from the first and second cylinders, respectively, towards an exhaust after treatment system, and a recirculation guide extending from the first exhaust guide to the second intake guide, the method comprising allowing air from the fresh air intake arrangement to be received in the first cylinder, allowing gases in the form of the air received in the first cylinder or gases including at least a portion of the air received in the first cylinder to be expelled from the first cylinder, controlling an exhaust valve located in the first exhaust guide so as to reduce or inhibit the transport of gases from the first cylinder to the exhaust after treatment system and to guide to the second cylinder gases expelled from the first cylinder, and simultaneously controlling the fuel system so as to inject fuel into the second cylinder, so as to provide repetitive, combustions with air in the gases guided to the second cylinder, and controlling the intake valve arrangement for throttling or inhibiting the supply to the second cylinder of air from the fresh air intake arrangement.

Similarly to as mentioned above, receiving in the first cylinder air from the fresh air intake arrangement and guiding to the second cylinder gases expelled from the first cylinder provides for heating by pre-conditioning of the air. Throttling or inhibiting the supply to the second cylinder of air from the fresh air intake arrangement limits temperature reductions caused by introduction of fresh air.

The exhaust valve may be at or downstream of the recirculation guide. The exhaust valve may effectively provide for selectively guiding a portion or all of the gases from the first cylinder into the recirculation guide. Thereby the amount of gases introduced to the first cylinder and reaching an EATS, without passing the second cylinder, may be selectively controlled. Thereby the mass flow through the engine may be effectively controlled.

Preferably the method comprises controlling the exhaust valve comprises controlling the exhaust valve so as to inhibit the transport of gases from the first cylinder to the exhaust after treatment system and to guide to the second cylinder all gases expelled from the first cylinder. By closing the exhaust valve, all gases introduced to the first cylinder may be guided to the second cylinder, and a significant increase of the temperature of gases reaching the EATS at low load operations, cold start events or low ambient temperatures may be provided.

Similarly to as described above, the method may comprise controlling the fuel system so as to inhibit injection of fuel into the air received in the first cylinder. The method may comprise by controlling the fuel system to inject fuel into the first cylinder so as to provide repetitive combustions with the air received in the first cylinder. Thereby, air remaining after first cylinder combustions and combustion products may be thoroughly mixed in the first cylinder and the first exhaust guide, ensuring a homogeneous gas mixture reaching the second cylinder. The amount of fuel injected for each combustion in the first cylinder is preferably smaller than the amount of fuel injected for each combustion in the second cylinder. Nevertheless, the first cylinder may contribute to a crankshaft torque of the engine.

Preferably, the method comprises controlling a ratio of air in the gases expelled from the first cylinder and guided to the second cylinder by controlling the amount of fuel injected into the first cylinder. Thereby, the amount of EGR gases in the second cylinder combustion processes may be controlled to a suitable level, e.g. for limiting NOx production in the second cylinder. The method may advantageously involve not recirculating any exhaust gases to the first cylinder. Thereby, the ratio of air, or the ratio of combustion products, also referred to as an EGR rate, in the gases expelled from the first cylinder and guided to the second cylinder, may be accurately calculated with the need for any sensor in the recirculation guide. This reduces the complexity of the engine, and also eliminates a problem of incorporating a sensor in a potentially harsh exhaust environment in the recirculation guide. Instead the EGR rate may be accurately calculated, e.g. based on the air intake boost temperature, the boost pressure, the volumetric efficiency and the amount of fuel injected into the first cylinder.

Preferably, where the intake valve arrangement comprises an intake divider valve, the second intake guide being arranged to receive air from the fresh air intake arrangement via the first intake guide, controlling the intake valve arrangement comprises at least partly closing the intake divider valve. Thereby the supply to the second cylinder of air from the fresh air intake may be inhibited by closing the intake divider valve. The intake divider valve may be provided e.g. as a flap or a throttle valve. Alternatively first and second throttle valves may be provided in the first and second intake guides, respectively, arranged to block a communication between the fresh air intake and the first and second cylinders, respectively. However, a single intake divider valve may replace two such first and second throttle valves, whereby complexity and cost is reduced.

Advantageously, the method comprises determining the temperature of gases expelled from the second cylinder, wherein the control of the intake valve arrangement is made in dependence on the determined temperature of the gases expelled from the second cylinder. Thereby, an effective way of controlling the temperature of gases reaching an EATS is provided.

Preferably, the method comprises determining a load of the engine, wherein the control of the intake valve arrangement is made in dependence on the determined engine load. Thereby, a further effective way of controlling the temperature of gases reaching an EATS is provided. For example, as the engine load increases, the intake valve arrangement may be controlled so as to gradually increase the amount of air reaching the second cylinder without passing the first cylinder, so as to avoid exhaust temperatures becoming too high.

Preferably, where a recirculation valve is arranged to control the flow through the recirculation guide, the method comprises controlling the exhaust valve and the recirculation valve so as to terminate or reduce the guiding to the second cylinder of gases expelled from the first cylinder, and substantially simultaneously controlling the intake valve arrangement so as to increase the supply to the second cylinder of air from the fresh air intake arrangement. Thereby, a smooth change from the heat mode described above, with gas transport from the first to the second cylinder, to a normal engine mode with all cylinders operating similarly, may take place.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
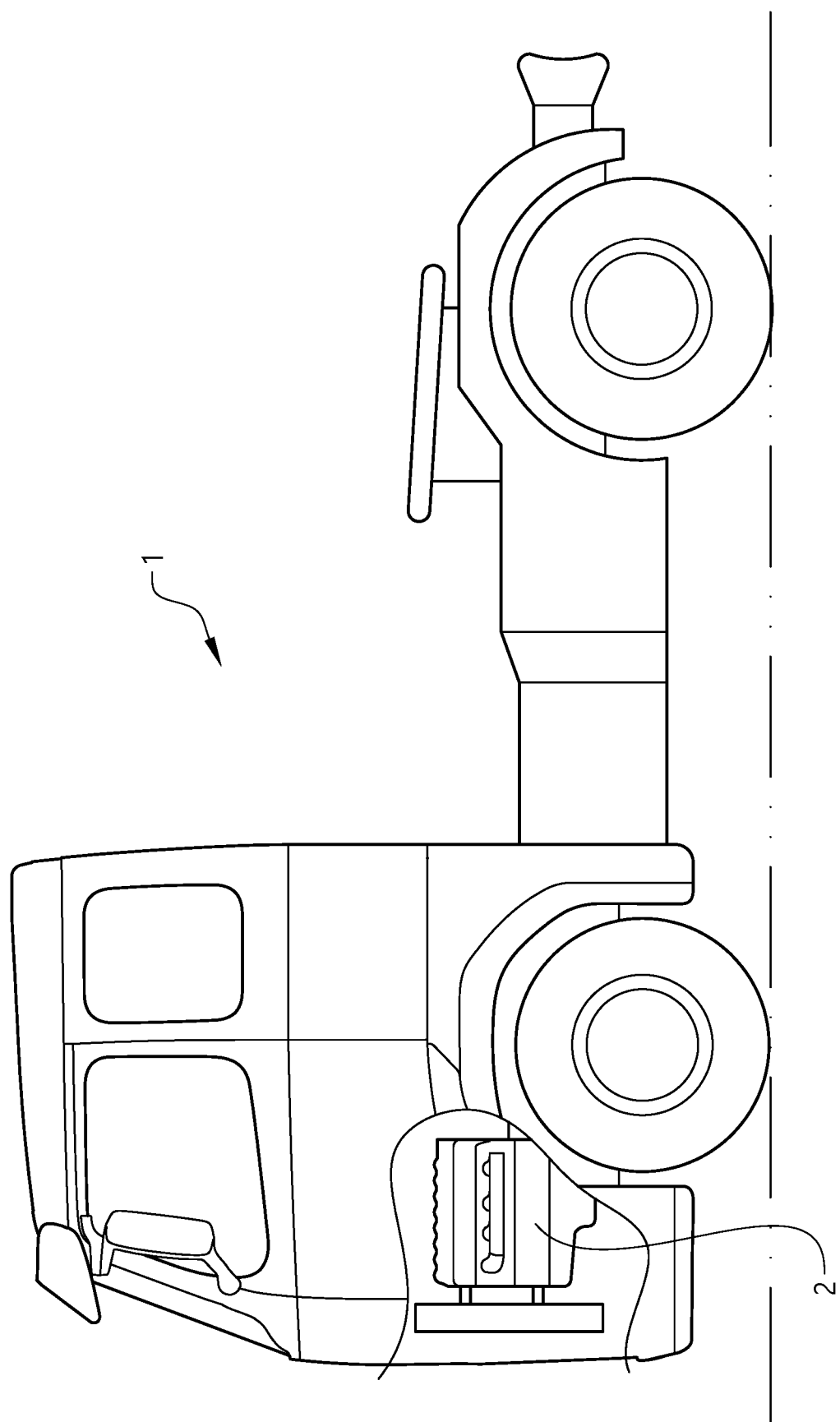
FIG. 1 is a side view of a truck comprising an internal combustion engine and an exhaust after treatment system.

FIG. 1 shows a vehicle 1 in the form of a truck in a partly cut side view. The vehicle 1 has an internal combustion engine 2 for the propulsion of the vehicle 1.

Figure 2:
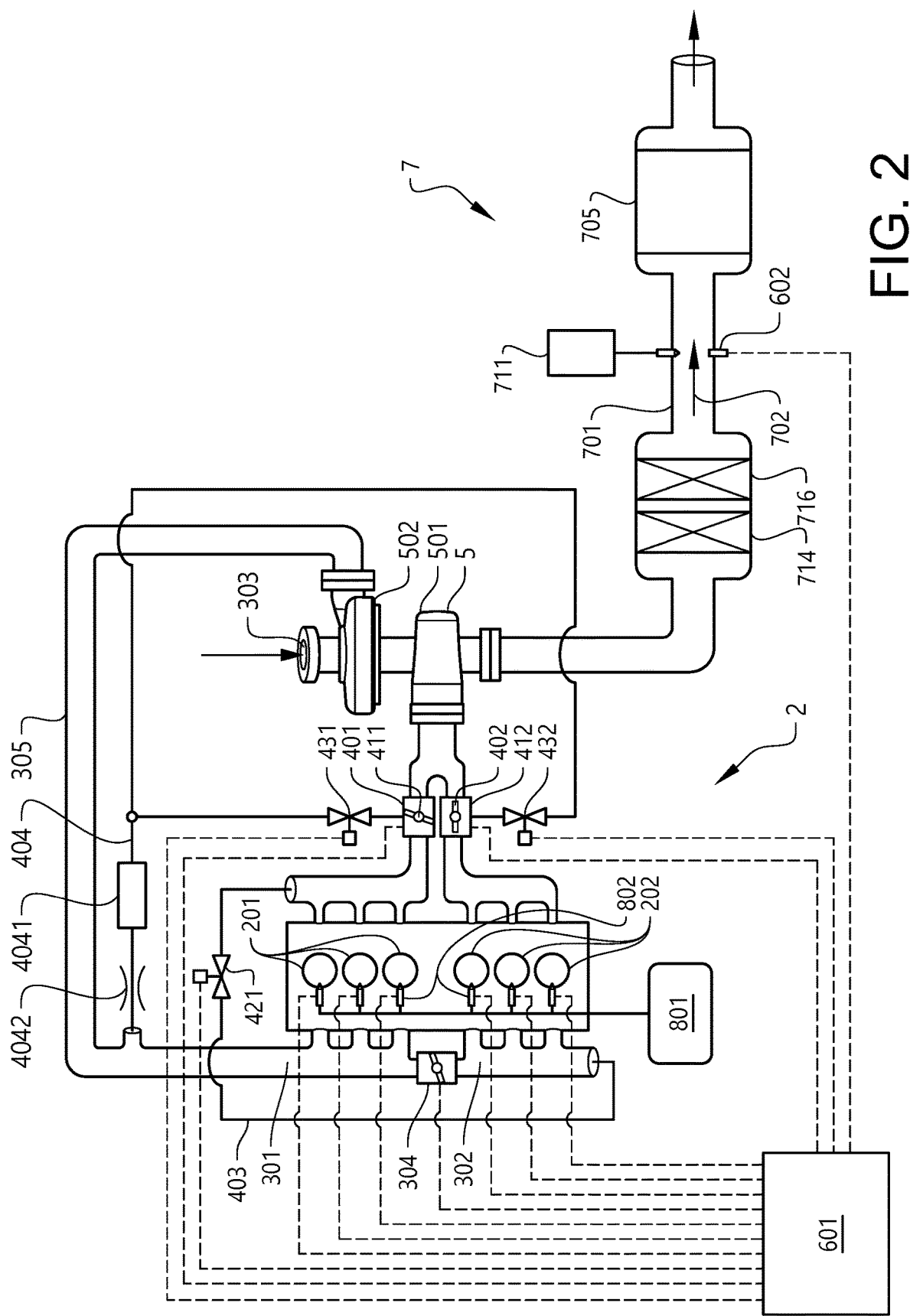
FIG. 2 is a diagram of the engine and the exhaust after treatment system in the vehicle in FIG. 1.

As depicted in FIG. 2, the engine 2 comprises a plurality of cylinders, in this example six cylinders in an inline configuration. The cylinders are divided into a first cylinder group and a second cylinder group. The cylinders in the first cylinder group are herein referred to as first cylinders 201. The cylinders in the second cylinder group are herein referred to as second cylinders 202. In this example there are three first cylinders and three second cylinders. It should be noted that the invention is equally applicable to engines with a different number of cylinder, e.g. two, three, seven, etc. Also, the number of cylinders in the first and second cylinder groups may be mutually different. In addition, the cylinder may have a configuration which different from an inline configuration, e.g. a V-configuration.

A control unit 601 is arranged to control devices in the engine 2 as described below.

The engine comprises a fuel system 801 arranged to inject fuel into the first and second cylinders 201, 202 by means of fuel injectors 802, each arranged to inject fuel directly into a respective of the cylinders 201, 202. The fuel injectors 802 are individually controllable by the control unit 601.

The cylinders 201, 202 are provided with pistons arrange to reciprocate in the cylinders. Each of the first and second cylinders 201, 202 is arranged to receive air from a fresh air intake arrangement 303. Thus, the cylinders are arranged to receive fuel, and to provide repetitive combustions by means of the received air and fuel. In this example, the engine is a diesel engine in which air received in the cylinders is compressed and fuel is injected into the compressed air.

The first and second cylinders 201, 202 are arranged to receive the air from the fresh air intake arrangement 303 via an air conduit, and first and second intake guides 301, 302, respectively. The first and second intake guides 301, 302 form together an air intake manifold. A first intake guide 301 and a second intake guide 302 are arranged to guide air to the first and second cylinders 201, 202, respectively, from a fresh air intake arrangement 303.

An intake valve arrangement 304 is arranged to control the provision of air to the second cylinders 202 via the second intake guide 302. The intake valve arrangement comprises an intake divider valve 304, the second intake guide 302 being arranged to receive the air via the first intake guide 301. The intake divider valve 304 divides the air intake manifold into the first and second intake guides 301, 302. The intake divider valve is controllable by the control unit 601. The intake divider valve 304 is throttle valve. The intake divider valve 304 may be partly or fully closed to throttle or inhibit the supply to the second cylinder 202 of air from the fresh air intake arrangement 303.

The engine 1 further comprises a first exhaust guide 401 and a second exhaust guide 402 arranged to guide gases from the first cylinders 201 and the second cylinders 202, respectively, towards an exhaust after treatment system (EATS) 7 described below. A first exhaust valve 411 is provided in the first exhaust guide 401 and arranged to selectively reduce or inhibit a gas flow through the first exhaust guide 401 towards the EATS 7. A second exhaust valve 412 is provided in the second exhaust guide 402 and arranged to selectively reduce or inhibit a gas flow through the second exhaust guide 402 towards the EATS 7. The first and second exhaust valves 401, 402 are controllable by the control unit 601.

An exhaust gas recirculating (EGR) passage 404 is provided for recirculating gases from the first and second exhaust guides 401, 402 to the first and second cylinder 201, 202. The EGR passage 404 presents two branches, each extending from one of the first and second exhaust guides 401, 402 to a common EGR passage portion. A first and a second EGR valve 431, 432 are arranged to control the flow through a respective of said EGR passage branches. The first and a second EGR valves 431, 432 are controllable by the control unit 601. An EGR cooler 4041 is arranged to cool gases guided in the EGR passage 404. A part of the EGR passage 404 is provided in the form of a venturi tube 4042. The venturi tube 4042 may be provided with a pressure difference sensor, which may be used for determining the EGR flow.

A turbo charger 5 comprises a turbine 501 which is located downstream of the exhaust valves 411, 412, and is arranged to receive gases from the first and second exhaust guides 401, 402. The turbine is arrange to drive a compressor 502 which is provided upstream of the first and second intake guides 301, 302 and downstream of the fresh air intake arrangement 303.

A recirculation guide 403 extends from the first exhaust guide 401 to the second intake guide 302. A recirculation valve 421, controllable by the control unit 601, is arranged to control the flow through the recirculation guide 403. The recirculation guide 403 is advantageously used as described below.

The vehicle 1 also comprises an exhaust after treatment system 7 for treating exhaust gases from the engine 2. The exhaust after treatment system 7 comprises an exhaust conduit 701 for conveying exhaust gases discharged from the engine 2, as indicated by the arrow 702. The exhaust after treatment system 7 further comprises a selective catalytic reduction (SCR) catalyst 705 provided in the exhaust conduit 701 for selectively reducing NOx contained in the exhaust gas. The exhaust after treatment system 7 further comprises means 711 for supplying a reductant, e.g. urea or ammonia, into the exhaust conduit 701 upstream of the SCR catalyst 705, for the NOx reduction process in the SCR catalyst. The exhaust after treatment system 7 also comprises upstream of the SCR catalyst 705 and upstream of the reductant supply means 711 an oxidation catalyst (DOC) 714 having the function of oxidizing carbon monoxide (CO), hydrocarbons (HC) and nitrogen monoxide (NO) contained in the exhaust gases. The exhaust after treatment system 7 further comprises a diesel particulate filter (DPF) 716 disposed downstream of the DOC 714 and upstream of the injector 713 for capturing and collecting particulate matter contained in exhaust gas.

The control unit 601 is arranged to determine the exhaust gas temperature by means of a temperature sensor 602 arranged to detect the temperature in the exhaust conduit 701.

Figure 3:
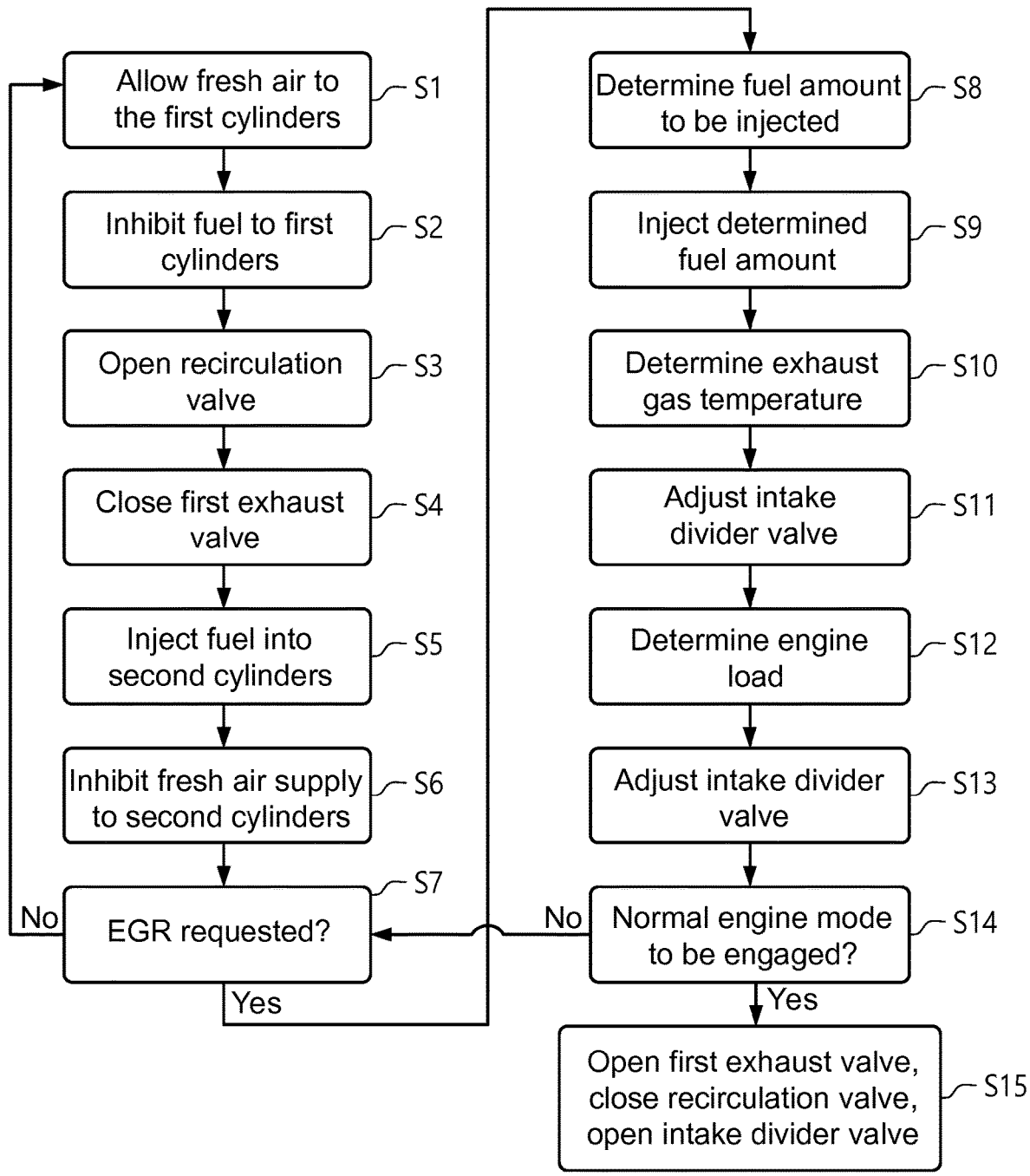
FIG. 3 shows a block diagram depicting steps in a method according to an embodiment of the invention to control the engine in FIG. 2.

Reference is made to FIG. 3 depicting steps in a method according to an embodiment of the invention to control the engine 2. During operational conditions in which the temperature of the exhaust gases from the engine are high enough for the EATS to work efficiently, air is guided from the fresh air intake arrangement 303 to all cylinders 201, 202, in which fuel is provided so as for all cylinders to contribute to a torque of a crankshaft of the engine.

When conditions are such that the temperature of the exhaust gases from the engine are not high enough for the EATS to work efficiently, e.g. during a cold start event, or extended idling or low load situations, the engine is controlled as follows:

Air from the fresh air intake arrangement 303 is allowed S1 to the first cylinders 201. The fuel system 801 is controlled so that no fuel is injected S2 by the fuel injectors for the first cylinders 201. Thereby, all air received in the first cylinders 201 will be expelled from the first cylinders into the first exhaust guide 401.

The recirculation valve 421 is controlled S3 to be open and the first exhaust valve 411 is controlled S4 to be closed. The second exhaust valve 412 is controlled to be open. Thereby, the transport of gases from the first cylinder 201 to the EATS 7 is inhibited and all gases expelled from the first cylinder 201 are guided to the second cylinder 202 via the recirculation guide 403. It should be noted that it is alternatively possible to throttle the first exhaust guide flow through the first exhaust valve 411 so that only a portion of the gases from the first cylinders 201 are guided through the recirculation guide 403.

Simultaneously, the fuel system 801 is controlled S5 so as to inject fuel into the second cylinders 202, so as to provide repetitive combustions with air in the gases guided to the second cylinders 202 from the first cylinders 201. Thereby, the intake divider valve 304 is controlled so as to inhibit S6 the supply to the second cylinders 202 of air from the fresh air intake arrangement 303. Thereby all gases received in the second cylinders 202 are guided from the first cylinders 201.

Exhaust gases from the second cylinders 202, provided with a high temperature due to said recirculation and said inhibition of the introduction of fresh air to the second cylinders 202, are guided to the EATS via the second exhaust guide 402 and the turbine 501.

The control unit 601 is arranged to determine S7 whether exhaust gas recirculation (EGR), during the use of the recirculation guide 403, should be requested, e.g. to reduce NOx production in the second cylinders 202. If EGR is requested, the steps S8-S14 described below may be carried out continuously or repetitively.

The amount of fuel to be injected into the first cylinders 201 is determined S8 based on the air mass flow from the air intake arrangement 303 and a desired EGR ratio, i.e. a ratio air, or a ratio of combustion products, in the gases expelled from the first cylinders 201 and guided to the second cylinders 202. The air mass flow may be determined based on the pressure in the first intake guide 301, e.g. determined by means of a pressure sensor (not shown) in the first intake guide 301, based on the temperature in the first intake guide 301, e.g. determined by means of a temperature sensor (not shown) in the first intake guide 301, and based on the volumetric efficiency of the engine. The fuel system 801 is controlled inject S9 fuel according to the determined fuel amount into the first cylinders 201 so as to provide repetitive combustions with the air received in the first cylinders 201.

Thus, method comprises controlling, by continuously or repeatedly adjusting S8, S9 the amount of fuel injected into the first cylinders 201, the EGR ratio by controlling the ratio of air, or the ratio of combustion products, in the gases expelled from the first cylinders 201 and guided to the second cylinders 202.

In this example combustions in the first cylinder are compression ignited in a diesel cycle manner. The amount of fuel injected for each combustion in the first cylinders 201 may be smaller than the amount of fuel injected for each combustion in the second cylinders 202. It is understood that the gases expelled from the first cylinders 201 comprise some combustion products as well as air not consumed by the combustions in the first cylinders.

By means of the temperature sensor 602 (FIG. 2) the exhaust gas temperature is continuously or repeatedly determined S10. In dependence of the determined exhaust gas temperature it is determined S11 whether to adjust the intake divider valve 304 so as to throttle the fresh air supply to the second cylinders 202, and thereby allow fresh air supply to the second cylinders 202. By opening the intake divider valve 304 the exhaust temperature may be reduced if desired.

The method further comprises continuously or repeatedly determining S12 a load of the engine 2. This may be done as is known per se, e.g. based on the air mass flow from the air intake arrangement 303, the amount of fuel injected into the cylinders 201, 202 and the rotational speed of the engine. Based on the determine engine load, it is determined S13 whether to adjust the intake divider valve 304 so as to throttle the fresh air supply to the second cylinders 202, and thereby allow fresh air supply to the second cylinders 202. If the engine load increases it may be desired to allow fresh air the second cylinders to decrease the exhaust temperature, and/or to allow a further increase of the engine load.

Where it is determined S14 to allow the engine to operate in a normal mode with all cylinders participating equally in the crankshaft torque production, the first exhaust valve 411 is opened, the recirculation valve 421 is closed S16, and the intake divider valve 304 is opened S15.

Figure 4:
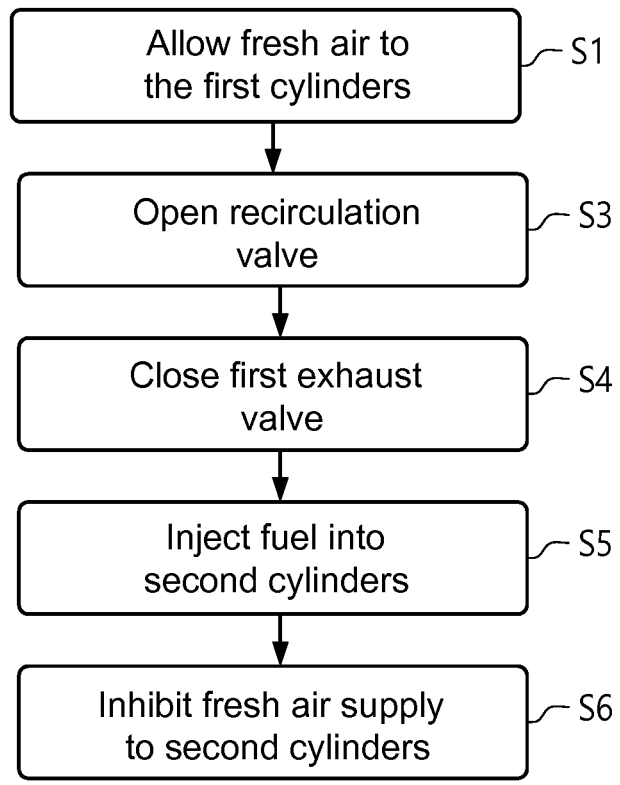
FIG. 4 shows a block diagram depicting steps in a method according to a further embodiment of the invention.

Reference is made to FIG. 4. In a further embodiment the engine 2 is controlled as follows. Air from the fresh air intake arrangement 303 is allowed S1 to the first cylinders 201. The recirculation valve 421 is controlled S3 to be open and the first exhaust valve 411 is controlled S4 to be closed. The second exhaust valve 412 is controlled to be open. Simultaneously, the fuel system 801 is controlled S5 so as to inject fuel into the second cylinders 202, so as to provide repetitive combustions with air in the gases guided to the second cylinders 202 from the first cylinders 201. Thereby, the intake divider valve 304 is controlled so as to inhibit S6 the supply to the second cylinders 202 of air from the fresh air intake arrangement 303.

It is to be understood that the present invention is not limited to the embodiments described above and illustrated in the drawings; rather, the skilled person will recognize that many changes and modifications may be made within the scope of the appended claims.

The invention claimed is:

1. A method for controlling an internal combustion engine comprising at least one first cylinder and at least one second cylinder with respective reciprocating pistons, first and second intake guides arranged to guide air from a fresh air intake arrangement to the first and second cylinders, respectively, an intake valve arrangement being arranged to control the provision of air to the second cylinder via the second intake guide a fuel system arranged to inject fuel into the first and second cylinders, a first exhaust guide and a second exhaust guide arranged to guide gases from the first and second cylinders, respectively, towards an exhaust after treatment system, and a recirculation guide extending from the first exhaust guide to the second intake guide the method comprising allowing air from the fresh air intake arrangement to be received in the first cylinder, allowing gases in the form of the air received in the first cylinder or gases including at least a portion of the air received in the first cylinder to be expelled from the first cylinder, controlling an exhaust valve located in the first exhaust guide so as to reduce or inhibit the transport of gases from the first cylinder to the exhaust after treatment system and to guide to the second cylinder gases expelled from the first cylinder, and simultaneously controlling the fuel system so as to inject fuel into the second cylinder, so as to provide repetitive combustions with air in the gases guided to the second cylinder, and controlling the intake valve arrangement for throttling or inhibiting the supply to the second cylinder of air from the fresh air intake arrangement, characterized by comprising determining the temperature of gases expelled from the second cylinder, wherein the control of the intake valve arrangement is made in dependence on the determined temperature of the gases expelled from the second cylinder.

2. A method according to claim 1, comprising controlling the fuel system so as to inhibit injection of fuel into the air received in the first cylinder.

3. A method according to claim 1, comprising controlling the fuel system to inject fuel into the first cylinder so as to provide repetitive combustions with the air received in the first cylinder.

4. A method according to claim 3, comprising controlling a ratio of air in the gases expelled from the first cylinder and guided to the second cylinder by controlling the amount of fuel injected into the first cylinder.

5. A method according to claim 1 wherein the intake valve arrangement comprises an intake divider valve, the second intake guide being arranged to receive air from the fresh air intake arrangement via the first intake guide, wherein controlling the intake valve arrangement comprises at least partly closing the intake divider valve.

6. A method according to claim 1 comprising determining a load of the engine, wherein the control of the intake valve arrangement is made in dependence on the determined engine load.

7. A method according to claim 1 a recirculation valve is arranged to control the flow through the recirculation guide, comprising controlling the exhaust valve and the recirculation valve so as to terminate or reduce the guiding to the second cylinder of gases expelled from the first cylinder, and substantially simultaneously controlling the intake valve arrangement so as to increase the supply to the second cylinder of air from the fresh air intake arrangement.

8. A method according to claim 1 that wherein a turbine of a turbo charger is located downstream of the exhaust valve.

9. A method according to claim 1 comprising recirculating gases from the first and second exhaust guides to the first and second cylinder by means of an exhaust gas recirculating (EGR) passage provided in addition to the recirculation guide.

10. A method according to claim 1 wherein the engine is adapted for a diesel cycle.

11. A computer configured to perform the method of claim 1.

12. A non-transitory computer readable medium configured to store instructions which perform the method of claim 1 when executed by a computer processor.

13. An internal combustion engine comprising the computer according to claim 11.

14. A vehicle comprising the engine according to claim 13.

* * * * *